US012716531B1

(12) United States Patent
Zhou et al.

(10) Patent No.: US 12,716,531 B1
(45) Date of Patent: Aug. 25, 2026

(54) TELESCOPIC DRAIN PIPE

(71) Applicant: ZHONGSHAN MEITU PLASTIC IND. CO., LTD., Zhongshan (CN)

(72) Inventors: Wenhui Zhou, Zhongshan (CN); Haojia Huang, Zhongshan (CN)

(73) Assignee: ZHONGSHAN MEITU PLASTIC IND. CO., LTD., Zhongshan (CN)

( * ) Notice: Subject to any disclaimer, the term of this patent is extended or adjusted under 35 U.S.C. 154(b) by 0 days.

(21) Appl. No.: 19/235,518

(22) Filed: Jun. 11, 2025

(30) Foreign Application Priority Data

Apr. 17, 2025 (CN) ........................ 202520735517.9

(51) Int. Cl.
*F16L 43/02* (2006.01)
*E03D 11/13* (2006.01)
*F16L 27/12* (2006.01)

(52) U.S. Cl.
CPC .......... *F16L 27/1273* (2019.08); *E03D 11/13* (2013.01); *F16L 43/02* (2013.01)

(58) Field of Classification Search
CPC ......... E03D 11/13; F16L 43/02; F16L 43/006; F16L 27/12; F16L 27/127; F16L 27/1273; F16L 37/0985
See application file for complete search history.

(56) References Cited

U.S. PATENT DOCUMENTS 1,889,711 A * 11/1932 Talley ................. F16L 27/1273 285/302
12,429,151 B1 * 9/2025 Buscicchio ............. F04B 53/20

FOREIGN PATENT DOCUMENTS

DE 102007010089 A1 * 9/2008 .......... F16L 27/1273

OTHER PUBLICATIONS

Wang, Yan-qing, CN-109680775-B, Feb. 26, 2021.*
Kawaguchi, Keita, CN-115198859-A, Oct. 18, 2022.*
Xu, Ming-gao, CN-218757800-U, Mar. 28, 2023.*
Chen, Can-ge, CN-215950646-U, Mar. 4, 2022.*
Liu, Hui-qiang, CN-210887492-U, Jun. 30, 2020.*

* cited by examiner

*Primary Examiner* — Matthew Troutman
*Assistant Examiner* — James A Linford
(74) *Attorney, Agent, or Firm* — Buchalter; Jason W. Croft

(57) ABSTRACT

A telescopic drain pipe includes a first pipe, a second pipe, and an unlocking member. The first pipe includes a first pipe body, with a positioning structure on an outer wall thereof. The positioning structure includes at least two positioning grooves spaced apart. The second pipe includes a second pipe body sleeved over the first pipe body and slidable relative to the first pipe body. The unlocking member includes an unlocking portion slidably mounted on an outer wall of the second pipe body and arranged corresponding to the positioning structure. The unlocking portion is connected to a buckle for engaging with one of the at least two positioning grooves of the positioning structure to fix the second pipe body relative to the first pipe body. The unlocking member is configured to drive the buckle to disengage from or engage into a corresponding positioning groove.

9 Claims, 3 Drawing Sheets

TELESCOPIC DRAIN PIPE

CROSS-REFERENCE TO RELATED APPLICATION

This application is based on and claims the benefit of priority from Chinese Patent Application No. 2025207355179, filed on 17 Apr. 2025, the entirety of which is incorporated by reference herein.

TECHNICAL FIELD

The present disclosure relates to the technical field of drain pipes, and in particular to a telescopic drain pipe.

BACKGROUND

A toilet, particularly a ceramic toilet, is generally connected to a sewer system through a drain pipe, such that sewage, excrement, etc. in the toilet can be discharged into the sewer system through the drain pipe. Different types of toilets require different lengths of drain pipes. However, drain pipes currently available on the market have a fixed length and cannot adapt to different types of toilets.

SUMMARY

The present disclosure aims to address at least one of the technical problems in the existing technology. To this end, the present disclosure provides a telescopic drain pipe, which can telescope to adjust its overall length to meet the installation requirements of different types of toilets.

A telescopic drain pipe according to an embodiment of the present disclosure includes a first pipe, a second pipe, and an unlocking member. The first pipe includes a first pipe body. An outer wall of the first pipe body is provided with a positioning structure. The positioning structure includes at least two positioning grooves spaced apart in a length direction of the first pipe body. The second pipe includes a second pipe body sleeved over the first pipe body and slidable relative to the first pipe body in the length direction of the first pipe body. The unlocking member includes an unlocking portion. The unlocking portion is slidably mounted on an outer wall of the second pipe body. The unlocking portion is arranged corresponding to the positioning structure. The unlocking portion is connected to a buckle. The buckle is configured to engage with one of the at least two positioning grooves of the positioning structure to fix the second pipe body relative to the first pipe body. The unlocking member is configured to drive the buckle to disengage from or engage into a corresponding positioning groove of the at least two positioning grooves.

The telescopic drain pipe according to the embodiment of the present disclosure at least has the following advantages. According to the drain pipe provided by the present disclosure, each positioning groove of the positioning structure forms one gear position, and by sliding the unlocking member, the buckle can be driven to disengage from or engage into the corresponding positioning groove. Once the buckle disengages from the corresponding positioning groove, the first pipe body and the second pipe body can be slid relative to each other to adjust the overall length of the drain pipe. After the drain pipe is adjusted to a required gear position to achieve a desired overall length, the unlocking member may be slid to cause the buckle to engage into the corresponding positioning groove, to fix the first pipe body and the second pipe body. Therefore, the drain pipe provided by the present disclosure can telescope to adjust its overall length to meet the installation requirements of different types of toilets.

According to some embodiments of the present disclosure, each of two opposite outer walls of the first pipe body is provided with the positioning structure, the unlocking member includes two opposite unlocking portions, the two unlocking portions are arranged in one-to-one correspondence with the two positioning structures, the unlocking member further includes a connection portion, and one end of one of the two unlocking portions is connected to one end of another unlocking portion by the connection portion.

According to some embodiments of the present disclosure, each of the at least two positioning grooves is inclined relative to the length direction of the first pipe body, a sliding direction of the unlocking portion is the same as an inclination direction of each of the at least two positioning grooves, and the unlocking portion is configured to drive the buckle to slide.

According to some embodiments of the present disclosure, one end of each of the at least two positioning grooves of the positioning structure is in communication with a clearance slot, the clearance slot is provided on the outer wall of the first pipe body, the unlocking member is configured to drive the buckle to slide into the clearance slot such that the buckle exits the respective positioning groove, and a side wall of the clearance slot opposite to the positioning grooves is configured to limit a sliding range of the buckle.

According to some embodiments of the present disclosure, the first pipe body is provided with a positioning projection in the respective positioning groove, the buckle includes two buckling portions spaced apart on the unlocking portion, and when the buckle is inserted into a corresponding positioning groove of the at least two positioning grooves, the two buckling portions of the buckle press against the two opposite side walls of the corresponding positioning groove respectively, and the positioning projection is engaged between the two buckling portions of the buckle.

According to some embodiments of the present disclosure, each of the buckling portions is provided with an anti-detachment hook projecting in the length direction of the first pipe body, the second pipe body is provided with a guide hole for the respective buckling portion to pass through, an extending direction of the guide hole is the same as a sliding direction of the unlocking portion, and the anti-detachment hook is located on a side of a side wall of the guide hole adjacent to an interior of the second pipe body.

According to some embodiments of the present disclosure, a sealing member is arranged between the first pipe body and the second pipe body, and the sealing member is mounted on an end of the first pipe body facing the second pipe body.

According to some embodiments of the present disclosure, the first pipe includes a first joint configured to connect to an external structure, the first joint is arranged at an end of the first pipe body facing away from the second pipe body, the second pipe includes a second joint configured to connect to another external structure, and the second joint is arranged at an end of the second pipe body facing away from the first pipe body.

According to some embodiments of the present disclosure, the first joint is provided with a waterproof rubber ring, and the second joint is provided with another waterproof rubber ring.

According to some embodiments of the present disclosure, the first joint is oriented perpendicular to the length direction of the first pipe body, the first joint is connected to a support portion, and the support portion is located on a side of the first joint facing away from the direction that the first joint is oriented.

Additional aspects and advantages of the present disclosure will be partly given in and partly apparent from the description below, or understood through practice of the present disclosure.

BRIEF DESCRIPTION OF DRAWINGS

The above and/or other additional aspects and advantages of the present disclosure would become apparent and comprehensible from the description of embodiments in connection with accompanying drawings, in which.

Figure 1:
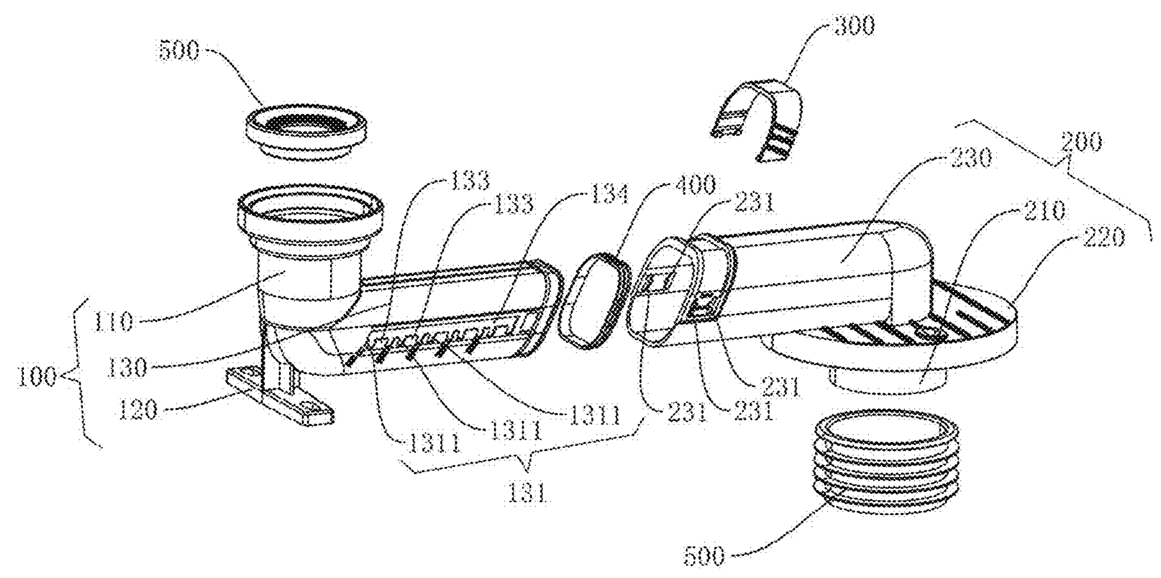
FIG. 1 is an exploded view of a telescopic drain pipe according to an embodiment of the present disclosure.

LIST OF REFERENCE NUMERALS first pipe 100; first joint 110; support portion 120; first pipe body 130; positioning structure 131; positioning groove 1311; chamfer 132; positioning projection 133; clearance slot 134; second pipe 200; second joint 210; support disc 220; second pipe body 230; guide hole 231; unlocking member 300; unlocking portion 310; buckle 311; buckling portion 3111; anti-detachment hook 3112; connection portion 320; sealing member 400; waterproof rubber ring 500.

DETAILED DESCRIPTION

Embodiments of the present disclosure will be described in detail below with reference to the accompanying drawings, in which the same or like reference numerals refer to the same or like elements or elements having the same or like functions throughout. The embodiments described below with reference to the accompanying drawings are illustrative and are intended for illustration only and are not to be construed as limiting the present disclosure.

In the description of the present disclosure, it should be understood that for the description of orientations, the orientation or positional relationships indicated by the terms such as "on," "below," "front," "rear," "left," and "right" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of the present disclosure.

In the description of the present disclosure, the term "several" means one or more, the term "a plurality of" (or multiple) means two or more, the term such as "greater than," "less than," "exceed" or variants thereof prior to a number or series of numbers is understood to not including the number adjacent to the term. The term "at least" prior to a number or series of numbers is understood to include the number adjacent to the term "at least," and all subsequent numbers or integers that could logically be included, as clear from context. If used herein, the terms such as "first" and "second" are merely used for distinguishing technical features, and are not intended to indicate or imply relative importance, or implicitly point out the number of the indicated technical features, or implicitly point out the order of the indicated technical features.

In the description of the present disclosure, unless otherwise explicitly defined, the terms such as "configure," "install/mount" and "connect" should be understood in a broad sense, and those having ordinary skills in the art can reasonably determine the specific meanings of the above terms in the present disclosure based on the specific contents of the technical scheme.

Figure 4:
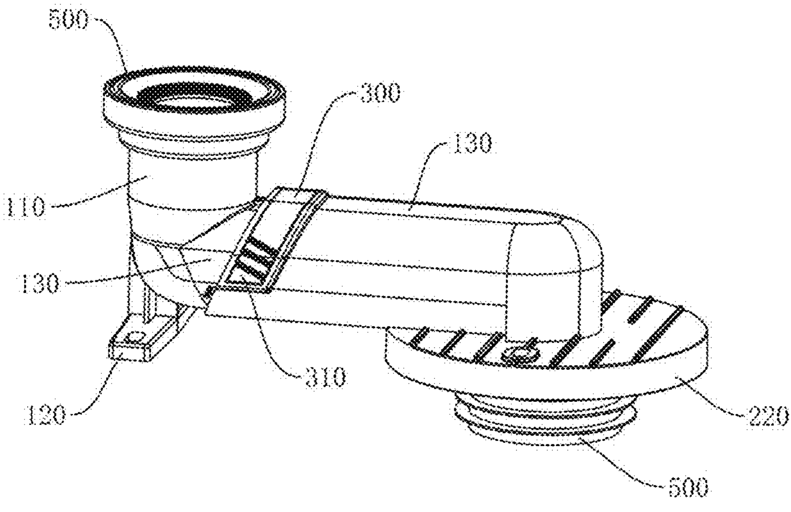
FIG. 4 is a schematic view of the telescopic drain pipe shown in FIG. 1 at a minimum length.

Referring to FIG. 1 and FIG. 4, a telescopic drain pipe according to an embodiment of the present disclosure includes a first pipe 100, a second pipe 200, and an unlocking member 300. The first pipe 100 includes a first pipe body 130. An outer wall of the first pipe body 130 is provided with a positioning structure 131. The positioning structure 131 includes at least two positioning grooves 1311 spaced apart in a length direction of the first pipe body 130. The second pipe 200 includes a second pipe body 230 sleeved over the first pipe body 130 and slidable relative to the first pipe body 130 in the length direction of the first pipe body 130. The unlocking member 300 includes an unlocking portion 310. The unlocking portion 310 is slidably mounted on an outer wall of the second pipe body 230. The unlocking portion 310 is arranged corresponding to the positioning structure 131. The unlocking portion 310 is connected to a buckle 311. The buckle 311 is configured to engage with one of the at least two positioning grooves 1311 of the positioning structure 131 to fix the second pipe body 230 relative to the first pipe body 130. The unlocking member 300 is configured to drive the buckle 311 to disengage from or engage into a corresponding positioning groove 1311 of the at least two positioning grooves 1311.

According to the drain pipe provided by the present disclosure, each positioning groove 1311 of the positioning structure 131 forms one gear position, and by sliding the unlocking member 300, the buckle 311 can be driven to disengage from or engage into the corresponding positioning groove 1311. Once the buckle 311 disengages from the corresponding positioning groove 1311, the first pipe body 130 and the second pipe body 230 can be slid relative to each other to adjust the overall length of the drain pipe. After the drain pipe is adjusted to a required gear position to achieve a desired overall length, the unlocking member 300 may be slid to cause the buckle 311 to engage into the corresponding positioning groove 1311, to fix the first pipe body 130 and the second pipe body 230. Therefore, the drain pipe provided by the present disclosure can telescope to adjust its overall length to meet the installation requirements of different types of toilets. The telescopic adjustment is simple and convenient.

Figure 2:
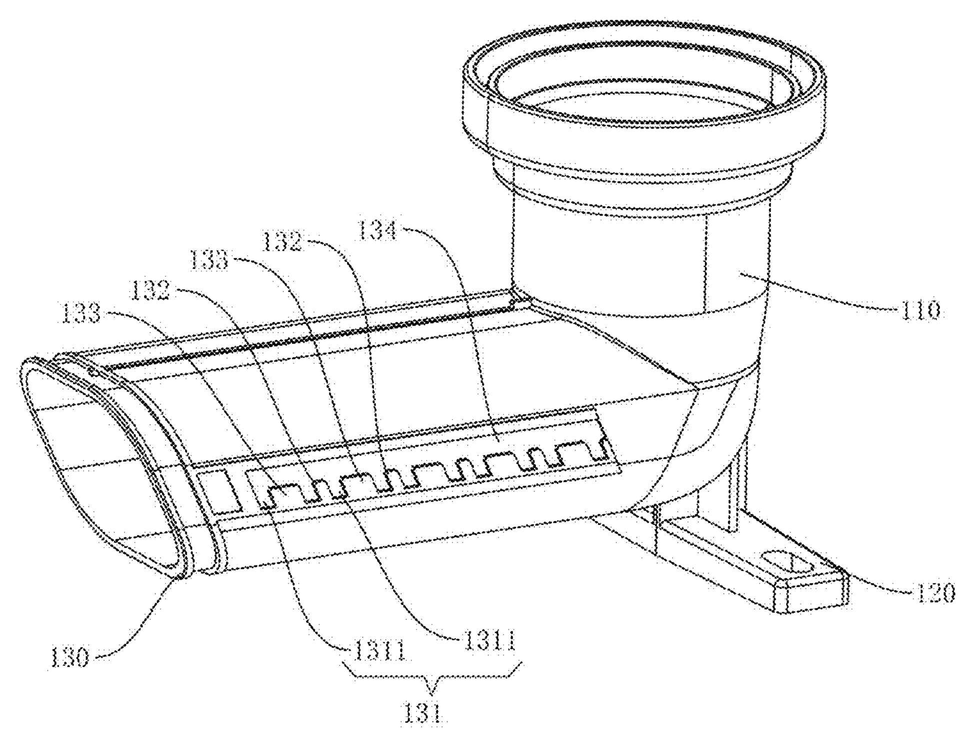
FIG. 2 is a schematic view of a first pipe of the telescopic drain pipe shown in FIG. 1.
Figure 3:
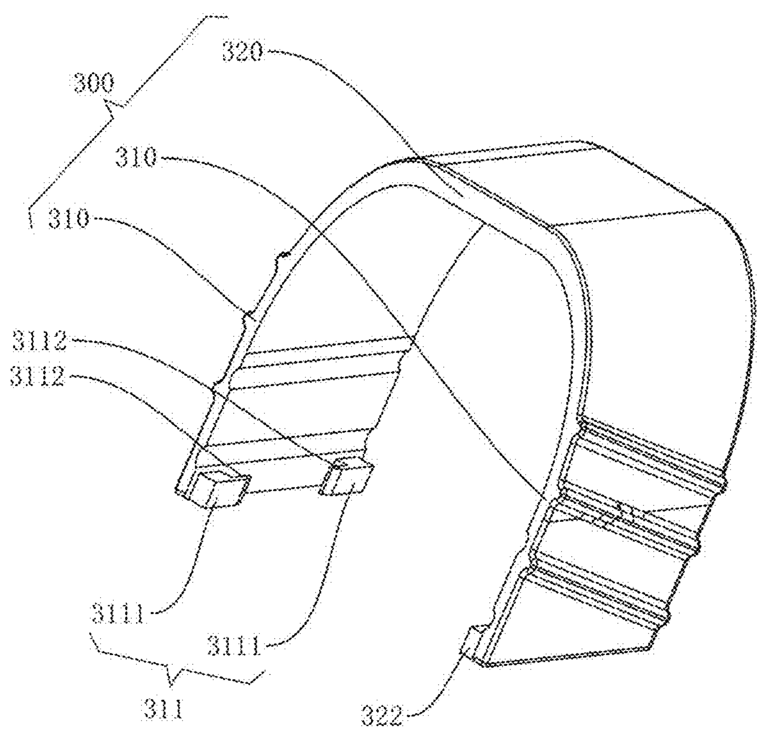
FIG. 3 is a schematic view of an unlocking member of the telescopic drain pipe shown in FIG. 1.

Referring to FIG. 1 to FIG. 3, according to some embodiments of the present disclosure, each of two opposite outer walls of the first pipe body 130 is provided with the positioning structure 131. The unlocking member 300 includes two opposite unlocking portions 310, and the two unlocking portions 310 are arranged in one-to-one correspondence with the two positioning structures 131. The unlocking member 300 further includes a connection portion 320, and one end of one of the two unlocking portions 310 is connected to one end of another unlocking portion 310 by the connection portion 320, such that the unlocking member 300 is U-shaped as a whole. The use of the buckles 311 on the two unlocking portions 310 to lock the first pipe body 130 and the second pipe body 230 can enhance the locking strength, such that the first pipe body 130 and the second pipe body 230 can be fixed more firmly.

Figure 5:
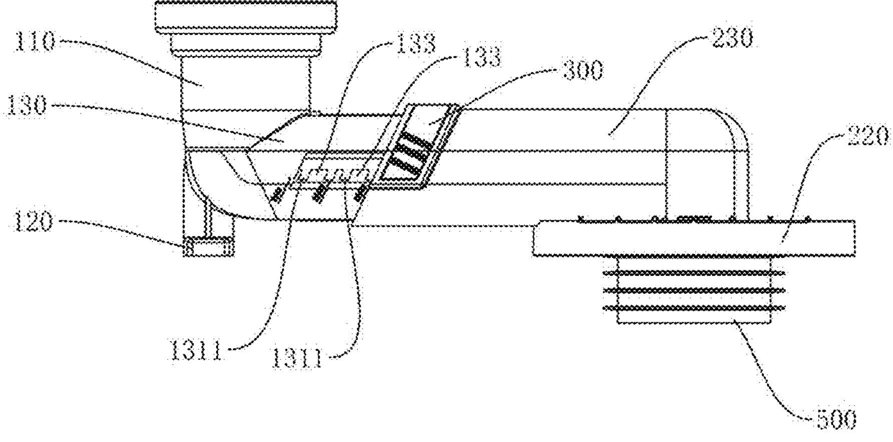
FIG. 5 is a schematic view of the telescopic drain pipe shown in FIG. 1 after length adjustment.

Referring to FIG. 1 and FIG. 5, according to some embodiments of the present disclosure, the positioning groove 1311 is inclined relative to the length direction of the first pipe body 130, a sliding direction of the unlocking portion 310 is the same as an inclination direction of the positioning groove 1311, and the unlocking portion 310 is configured to drive the buckle 311 to slide. With the above configuration, during the adjustment of the drain pipe to the required gear position by sliding the second pipe body 230 relative to the first pipe body 130, if there is a certain degree of misalignment between the first pipe body 130 and the second pipe body 230 in the length direction, the inclined positioning groove 1311 makes it easier to push the second pipe body 230 to slid relative to the first pipe body 130 under the action of the unlocking portion 310 and the buckle 311 to correct the misalignment between the first pipe body 130 and the first pipe body 130 in the process of sliding the unlocking portion 310 to cause the buckle 311 to engage into the corresponding positioning groove 1311. As such, the buckle 311 can easily slide into the positioning groove 1311. With the above configuration, the unlocking member 300 can be operated more conveniently and easily for locking.

Referring to FIG. 2, in a specific implementation process, the buckle 311 may be provided with a transition fillet or chamfer 132, and/or a transition fillet or chamfer 132 may be provided on a side wall of an opening of the positioning groove 1311, to guide the buckle 311 into the positioning groove 1311.

After the unlocking member 300 is slid to cause the buckle 311 to disengage from the corresponding positioning groove 1311, the connection portion 320 of the unlocking member 300 projects from the second pipe body 230. As such, operation personnel can grip the connection portion 320 and lift the second pipe body 230, and can also conveniently push the connection portion 320 to slid the second pipe body 230.

Referring to FIG. 1 and FIG. 2, according to some embodiments of the present disclosure, one end of each of the at least two positioning grooves 1311 of the positioning structure 131 is in communication with a clearance slot 134. The clearance slot 134 is provided on the outer wall of the first pipe body 130. The unlocking member 300 is configured to drive the buckle 311 to slide into the clearance slot 134 such that the buckle 311 exits the positioning groove 1311. A side wall of the clearance slot 134 opposite to the positioning groove 1311 is configured to limit a sliding range of the buckle 311, thereby preventing the unlocking member 300 from detaching from the second pipe body 230.

Referring to FIG. 1 and FIG. 2, according to some embodiments of the present disclosure, the first pipe body 130 is provided with a positioning projection 133 in the positioning groove 1311. The buckle 311 includes two buckling portions 3111 spaced apart on the unlocking portion 310. When the buckle 311 is inserted into a corresponding positioning groove of the at least two positioning grooves 1311, the two buckling portions 3111 of the buckle 311 press against the two opposite side walls of the positioning groove 1311 respectively, and the positioning projection 133 is engaged between the two buckling portions 3111 of the buckle 311. With the above configuration, the locking performance of the buckle 311 can be improved, such that the first pipe body 130 and the second pipe body 230 can be fixed more firmly.

Referring to FIG. 2, in a specific implementation process, two side walls of the positioning projection 133 in the length direction of the first pipe body 130 are parallel to the two opposite side walls of the positioning groove 1311, i.e., the positioning projection 133 is inclined relative to the length direction of the first pipe body 130.

Referring to FIG. 3, according to some embodiments of the present disclosure, the buckling portion 3111 is provided with an anti-detachment hook 3112 projecting in the length direction of the first pipe body 130, the second pipe body 230 is provided with a guide hole 231 for the buckling portion 3111 to pass through, an extending direction of the guide hole 231 is the same as the sliding direction of the unlocking portion 310, and the anti-detachment hook 3112 is located on a side of a side wall of the guide hole 231 adjacent to an interior of the second pipe body 230. The buckling portion 3111 of the buckle 311 generally has a certain elasticity, and therefore the anti-detachment hook 3112 can deform to pass through the guide hole 231 and enter the interior of the second pipe body 230. With the above configuration, the anti-detachment hook 3112 can effectively prevent the unlocking portion 310 from falling off the second pipe body 230.

It should be noted that the buckle 311 may also be configured in other manners. For example, in some other embodiments, the buckle 311 is rotatably mounted on the second pipe body 230, and a first end of the buckle 311 is hinged to the unlocking portion 310, such that when the unlocking portion 310 is slid, a second end of the buckle 311 can be driven to swing in and out of the positioning groove 1311.

Referring to FIG. 1, according to some embodiments of the present disclosure, a sealing member 400 is arranged between the first pipe body 130 and the second pipe body 230, and the sealing member 400 is mounted on an end of the first pipe body 130 facing the second pipe body 230. As such, leakage of sewage between the first pipe body 130 and the second pipe body 230 can be avoided while adjusting the length of the telescopic sewage pipe. In an implementation process, two or more sealing members 400 may be provided on the first pipe body 130 to enhance the sealing performance.

Referring to FIG. 1 and FIG. 4, according to some embodiments of the present disclosure, the first pipe 100 includes a first joint 110 configured to connect to an external structure, and the first joint 110 is arranged at an end of the first pipe body 130 facing away from the second pipe body 230. The second pipe 200 includes a second joint 210 configured to connect to another external structure, and the second joint 210 is arranged at an end of the second pipe body 230 facing away from the first pipe body 130. The first joint 110 and the second joint 210 are respectively compatible with a connection port on a toilet and a connection port of a sewer system, thereby facilitating the mounting of the drain pipe on the toilet.

Referring to FIG. 1 and FIG. 4, according to some embodiments of the present disclosure, the first joint 110 is provided with a waterproof rubber ring 500 to prevent sewage leakage at the first joint 110, and the second joint 210 is provided with a waterproof rubber ring 500 to prevent sewage leakage at the second joint 210.

Referring to FIG. 1 and FIG. 4, according to some embodiments of the present disclosure, the first joint 110 is oriented perpendicular to the length direction of the first pipe body 130. The first joint 110 is connected to a support portion 120. The support portion 120 is located on a side of the first joint 110 facing away from the direction that the first joint 110 is oriented.

Generally, when the toilet discharges sewage through the drain pipe, the connection between the first joint 110 and the first pipe body 130 is subjected to repeated impact, and after long-term use, the drain pipe may be damaged and the connection between the first joint 110 and the toilet may be loosened.

Referring to FIG. 5, in the present disclosure, after the toilet is connected to the first joint 110, the support portion 120 is pressed against ground. As such, the support portion 120 can support the first joint 110 to improve the ability of the first joint 110 to resist impact, thereby prolonging the service life of the drain pipe.

Referring to FIG. 1 and FIG. 5, according to some embodiments of the present disclosure, the second joint 210 is oriented opposite to the first joint 110, a support disc 220 is arranged on the second joint 210, a bottom surface of the support disc 220 is flush with a bottom surface of the support portion 120, and a bottom surface of the second pipe body 230 is closely fitted to the support disc 220. As such, after the drain pipe is installed between the toilet and the sewer system, the second joint 210 and the second pipe body 230 can be supported by the support disc 220.

The technical features of the above-described embodiments may be arbitrarily combined. For the sake of brevity of description, not all possible combinations of the technical features in the above embodiments are described. However, all the combinations of these technical features are contemplated to fall within the scope of the present disclosure if not in collision.

The embodiments of the present disclosure have been described in detail above with reference to the accompanying drawings, but the present disclosure is not limited to the above embodiments, and various changes may be made within the knowledge of those having ordinary skills in the art without departing from the gist of the present disclosure.

What is claimed is:

1. A telescopic drain pipe, comprising:

a first pipe, comprising a first pipe body, wherein an outer wall of the first pipe body is provided with a positioning structure, and the positioning structure comprises at least two positioning grooves spaced apart in a length direction of the first pipe body;

a second pipe, comprising a second pipe body sleeved over the first pipe body and slidable relative to the first pipe body in the length direction of the first pipe body; and an unlocking member, comprising an unlocking portion, wherein the unlocking portion is slidably mounted on an outer wall of the second pipe body, the unlocking portion is arranged corresponding to the positioning structure, the unlocking portion is connected to a buckle, the buckle is configured to engage with one of the at least two positioning grooves of the positioning structure to fix the second pipe body relative to the first pipe body, and the unlocking member is configured to drive the buckle to disengage from or engage into a corresponding positioning groove of the at least two positioning grooves, wherein the first pipe body is provided with a positioning projection in the respective positioning groove, the buckle comprises two buckling portions spaced apart on the unlocking portion, and when the buckle is inserted into a corresponding positioning groove of the at least two positioning grooves, the two buckling portions of the buckle press against the two opposite side walls of the corresponding positioning groove respectively, and the positioning projection is engaged between the two buckling portions of the buckle.

2. The telescopic drain pipe of claim 1, wherein each of two opposite outer walls of the first pipe body is provided with the positioning structure, the unlocking member comprises two opposite unlocking portions, the two unlocking portions are arranged in one-to-one correspondence with the two positioning structures, the unlocking member further comprises a connection portion, and one end of one of the two unlocking portions is connected to one end of another unlocking portion by the connection portion.

3. The telescopic drain pipe of claim 1, wherein each of the at least two positioning grooves is inclined relative to the length direction of the first pipe body, a sliding direction of the unlocking portion is the same as an inclination direction of each of the at least two positioning grooves, and the unlocking portion is configured to drive the buckle to slide.

4. The telescopic drain pipe of claim 1, wherein one end of each of the at least two positioning grooves of the positioning structure is in communication with a clearance slot, the clearance slot is provided on the outer wall of the first pipe body, the unlocking member is configured to drive the buckle to slide into the clearance slot such that the buckle exits the respective positioning groove, and a side wall of the clearance slot opposite to the positioning grooves is configured to limit a sliding range of the buckle.

5. The telescopic drain pipe of claim 1, wherein each of the buckling portions is provided with an anti-detachment hook projecting in the length direction of the first pipe body, the second pipe body is provided with a guide hole for the respective buckling portion to pass through, an extending direction of the guide hole is the same as a sliding direction of the unlocking portion, and the anti-detachment hook is located on a side of a side wall of the guide hole adjacent to an interior of the second pipe body.

6. The telescopic drain pipe of claim 1, wherein a sealing member is arranged between the first pipe body and the second pipe body, and the sealing member is mounted on an end of the first pipe body facing the second pipe body.

7. The telescopic drain pipe of claim 1, wherein the first pipe comprises a first joint configured to connect to an external structure, the first joint is arranged at an end of the first pipe body facing away from the second pipe body, the second pipe comprises a second joint configured to connect to another external structure, and the second joint is arranged at an end of the second pipe body facing away from the first pipe body.

8. The telescopic drain pipe of claim 7, wherein the first joint is provided with a waterproof rubber ring, and the second joint is provided with another waterproof rubber ring.

9. The telescopic drain pipe of claim 7, wherein the first joint is oriented perpendicular to the length direction of the first pipe body, the first joint is connected to a support portion, and the support portion is located on a side of the first joint facing away from a direction that the first joint is oriented.

* * * * *